United States Patent
Miyakawa et al.

(10) Patent No.: US 10,249,977 B2
(45) Date of Patent: Apr. 2, 2019

(54) CONNECTOR, CONNECTOR COVER, AND WIRE HARNESS

(71) Applicant: Yazaki Corporation, Tokyo (JP)

(72) Inventors: Tomoyuki Miyakawa, Tochigi (JP); Takuya Ishida, Tochigi (JP); Shuhei Nakada, Tochigi (JP)

(73) Assignee: YAZAKI CORPORATION, Minato-ku, Tokyo (JP)

(*) Notice: Subject to any disclaimer, the term of this patent is extended or adjusted under 35 U.S.C. 154(b) by 0 days.

(21) Appl. No.: 15/706,863

(22) Filed: Sep. 18, 2017

(65) Prior Publication Data
US 2018/0083383 A1   Mar. 22, 2018

(30) Foreign Application Priority Data
Sep. 20, 2016 (JP) ................. 2016-183219

(51) Int. Cl.
*H02G 3/08* (2006.01)
*B60R 16/02* (2006.01)
(Continued)

(52) U.S. Cl.
CPC ....... *H01R 13/516* (2013.01); *B60R 16/0215* (2013.01); *H01R 13/6273* (2013.01);
(Continued)

(58) Field of Classification Search
CPC  H01R 13/6335; H01R 13/5833; H01R 13/58; H01R 13/506; H01R 13/516;
(Continued)

(56) References Cited

U.S. PATENT DOCUMENTS 5,741,147 A * 4/1998 Konoya ................. H01R 31/08
                                                                 439/189
5,897,392 A   4/1999 Takahashi et al.
(Continued)

FOREIGN PATENT DOCUMENTS

CN    104081588 A   10/2014
CN    104124573 A   10/2014
(Continued)

OTHER PUBLICATIONS

Communication dated Aug. 21, 2018, from the Japanese Patent Office in counterpart application No. 2016-183219.
(Continued)

*Primary Examiner* — Gary F Paumen
(74) *Attorney, Agent, or Firm* — Sughrue Mion, PLLC

(57) ABSTRACT

A connector of a wire harness includes a connector housing provided with a terminal and capable of being fitted in an attachment hole formed in an attachment panel in an axial direction, and a connector cover attached to the connector housing, the connector cover causing a wiring material connected with the terminal to be inserted into the connector cover and causing the wiring material to offset along an intersecting direction. The connector cover includes a grip portion formed in such a shape that the grip portion is capable of being gripped at a position where the grip portion is exposed in an insertion hole formed in an opposite panel arranged to face the attachment panel in an opposed manner in the axial direction so as to cause the connector housing to pass through the insertion hole, the insertion hole being located at a position deviated from the attachment hole in the intersecting direction.

20 Claims, 5 Drawing Sheets

(51) Int. Cl.
  *H01R 13/58* (2006.01)
  *H01R 13/74* (2006.01)
  *H01R 13/516* (2006.01)
  *H01R 13/627* (2006.01)
(52) U.S. Cl.
  CPC ............. *H01R 13/743* (2013.01); *H02G 3/08* (2013.01); *H01R 13/5833* (2013.01)
(58) Field of Classification Search
  CPC .... H01R 13/6273; H01R 13/743; H02G 3/08; B60R 16/0215
  USPC ............. 439/476.1, 483, 456, 459, 470, 473
  See application file for complete search history.

(56) References Cited

U.S. PATENT DOCUMENTS

| | | | | |
|---|---|---|---|---|
| 6,231,375 | B1* | 5/2001 | Kashiyama | H01R 9/2416 439/456 |
| 6,751,392 | B1* | 6/2004 | Szilagyi | H01R 13/5833 385/134 |
| 7,264,499 | B2* | 9/2007 | Kondas | H01R 13/72 439/456 |
| 7,507,109 | B2* | 3/2009 | Tran | A47L 11/34 174/153 G |
| 9,306,320 | B2* | 4/2016 | Kataoka | H01R 13/506 |
| 9,728,890 | B2* | 8/2017 | Nakai | H01R 13/5816 |
| 2002/0177351 | A1* | 11/2002 | Kihira | H01R 13/5833 439/468 |
| 2006/0141867 | A1* | 6/2006 | Liu | H01R 9/03 439/660 |
| 2008/0299818 | A1* | 12/2008 | Hughes | H01R 13/53 439/445 |
| 2015/0056846 | A1 | 2/2015 | Kataoka et al. | |
| 2015/0222052 | A1 | 8/2015 | Akagi | |
| 2017/0062984 | A1* | 3/2017 | Moseke | H01R 13/6272 |

FOREIGN PATENT DOCUMENTS

| | | |
|---|---|---|
| CN | 104425957 A | 3/2015 |
| JP | 8298155 A | 11/1996 |
| JP | 2014-053206 A | 3/2014 |
| JP | 201541565 A | 3/2015 |
| WO | 2011/016579 A1 | 2/2011 |
| WO | 2013/115414 A1 | 8/2013 |

OTHER PUBLICATIONS

Office Action issued by the Intellectual Property Office of the P.R. of China dated Dec. 19, 2018 in application No. 201710846701.0.

* cited by examiner

CONNECTOR, CONNECTOR COVER, AND WIRE HARNESS

CROSS-REFERENCE TO RELATED APPLICATION(S)

The present application claims priority to and incorporates by reference the entire contents of Japanese Patent Application No. 2016-183219 filed in Japan on Sep. 20, 2016.

BACKGROUND OF THE INVENTION

1. Field of the Invention

The present invention relates to a connector, a connector cover, and a wire harness.

2. Description of the Related Art

As a conventional connector applicable to a wire harness or the like of a vehicle, Japanese Patent Application Laid-open No. 2014-053206 discloses, for example, a panel fixing type connector device including a first connector housing fitted in an attachment hole of a panel from one side of the panel in a direction orthogonal to the panel, and a second connector housing fitted in the first connector housing through the attachment hole from the other side of the panel in the direction orthogonal to the panel sandwiched between the first connector housing and the second connector housing. In the panel fixing type connector device, the first and second connector housings accommodate therein respective terminals to be electrically connected with each other when the first and second connector housings are fitted in each other, thus constituting a first connector and a second connector, respectively.

However, in the panel fixing type connector device described in Japanese Patent Application Laid-open No. 2014-053206, for example, an attaching workability of the panel fixing type connector device to the panel leaves much room for improvement.

SUMMARY OF THE INVENTION

The present invention is made under such circumstances, and it is an object of the present invention to provide a connector, a connector cover, and a wire harness that are capable of enhancing the attaching workability thereof to an attachment panel.

In order to achieve the above mentioned object, a connector according to one aspect of the present invention includes a connector housing provided with a terminal and capable of being fitted in an attachment hole formed in an attachment panel in an axial direction, and a cover attached to the connector housing, the cover causing a wiring material connected with the terminal to be inserted into the cover in the axial direction and causing the wiring material to offset in an intersecting direction intersecting with the axial direction, wherein the cover includes a grip portion formed in such a shape that the grip portion is capable of being gripped at a position where the grip portion is exposed in an insertion hole which is formed in an opposite panel arranged to face the attachment panel in the axial direction, through which the connector housing is capable of passing through the insertion hole, the insertion hole being, and which is located at a position deviated from the attachment hole in the intersecting direction, as viewed in the axial direction, in a state where the connector housing is fitted in the attachment hole.

According to another aspect of the present invention, in the connector, the cover may include a depression portion arranged adjacent to the grip portion, the depression portion being formed so that the connector housing is capable of being depressed into the attachment hole in the axial direction, the depression portion being arranged in an exposed manner in the insertion hole as viewed in the axial direction.

According to still another aspect of the present invention, in the connector, the depression portion may include a flat face formed in the intersecting direction.

According to still another aspect of the present invention, in the connector, the connector housing may include a corner portion configured to constitute a fulcrum of rotational operation that rotates the connector housing to a fitting position within the attachment hole, the corner portion being located at a position abutting with an attachment edge portion that defines the attachment hole.

According to still another aspect of the present invention, in the connector, the attachment hole and the insertion hole may be arranged so that at least a part of the attachment hole is located outside an area of the insertion hole as viewed in the axial direction.

According to still another aspect of the present invention, in the connector, the attachment hole and the insertion hole may be arranged so that a centroid position of the attachment hole is located outside an area of that of the insertion hole as viewed in the axial direction.

According to still another aspect of the present invention, in the connector, the attachment hole and the insertion hole may be arranged so that a centroid position of the attachment hole and a centroid position of the insertion hole are located at respective positions deviated from each other in the intersecting direction and in two directions orthogonal to each other.

According to still another aspect of the present invention, in the connector, the attachment hole and the insertion hole may be located at respective positions so as not to overlap with each other as viewed in the axial direction.

A connector cover according to still another aspect of the present invention includes an attachment portion attached to a connector housing fitted in an attachment hole in an axial direction, the connector housing being provided with a terminal, the attachment hole being formed in an attachment panel, an offset portion configured to cause a wiring material connected to the terminal to be inserted into the offset portion in the axis direction, the offset portion causing the wiring material to offset in an intersecting direction intersecting with the axis direction, and a grip portion formed in such a shape that the grip portion is capable of being gripped at a position where the grip portion is exposed in an insertion hole formed in an opposite panel arranged to face the attachment panel in an opposed manner in the axial direction so as to cause the connector housing to pass through the insertion hole, the insertion hole being located at a position deviated from the attachment hole in the intersecting direction, as viewed in the axial direction, in a state where the connector housing is fitted in the attachment hole.

A wire harness according to still another aspect of the present invention includes a conductive wiring material, and a connector connected with the wiring material, wherein the connector includes a connector housing provided with a terminal connected with the wiring material, and capable of being fitted in an attachment hole formed in an attachment panel in an axial direction, and a cover attached to the connector housing, the cover causing the wiring material to be inserted into the cover in the axial direction and causing the wiring material to offset in an intersecting direction intersecting with the axial direction, and the cover includes a grip portion formed in such a shape that the grip portion is capable of being gripped at a position where the grip portion is exposed in an insertion hole which is formed in an opposite panel arranged to face the attachment panel in the axial direction, through which the connector housing is capable of passing, and which is located at a position deviated from the attachment hole in the intersecting direction, as viewed in the axial direction, in a state where the connector housing is fitted in the attachment hole.

The above and other objects, features, advantages and technical and industrial significance of this invention will be better understood by reading the following detailed description of presently preferred embodiment of the invention, when considered in connection with the accompanying drawings.

DETAILED DESCRIPTION OF THE PREFERRED EMBODIMENTS

Hereinafter, an embodiment according to the present invention is specifically explained with reference to the accompanying drawings. Here, the present invention is not limited to the embodiment. Furthermore, constitutional features in the following embodiment include a part that can easily be thought by those skilled in the art, or parts substantially identical with each other.

In the following explanation, in a first direction, a second direction, and a third direction that intersect with each other, the first direction is referred to as "axial direction X", the second direction is referred to as "width direction Y", and the third direction is referred to as "height direction Z." Here, the axial direction X, the width direction Y, and the height direction Z are orthogonal to each other, and each of the width direction Y and the height direction Z corresponds to an intersecting direction intersecting with the axial direction X. The axial direction X typically corresponds to a direction where a terminal held by a connector housing described below extends, that is, a direction along the extending direction of a terminal insertion chamber for holding the terminal. The axial direction X is a direction along the insertion direction of the terminal when the terminal is inserted into the terminal insertion chamber. The axial direction X corresponds to a thickness direction of an attachment panel or an opposite panel that are described below, and the width direction Y and the height direction Z correspond to the extending directions of the attachment panel and the opposite panel. Furthermore, the axial direction X corresponds to a fitting direction of the connector housing with respect to an attachment hole formed in the attachment panel. Each direction used in the following explanation indicates a direction in a state that respective parts are assembled, unless otherwise noted.

Embodiment

Figure 1:
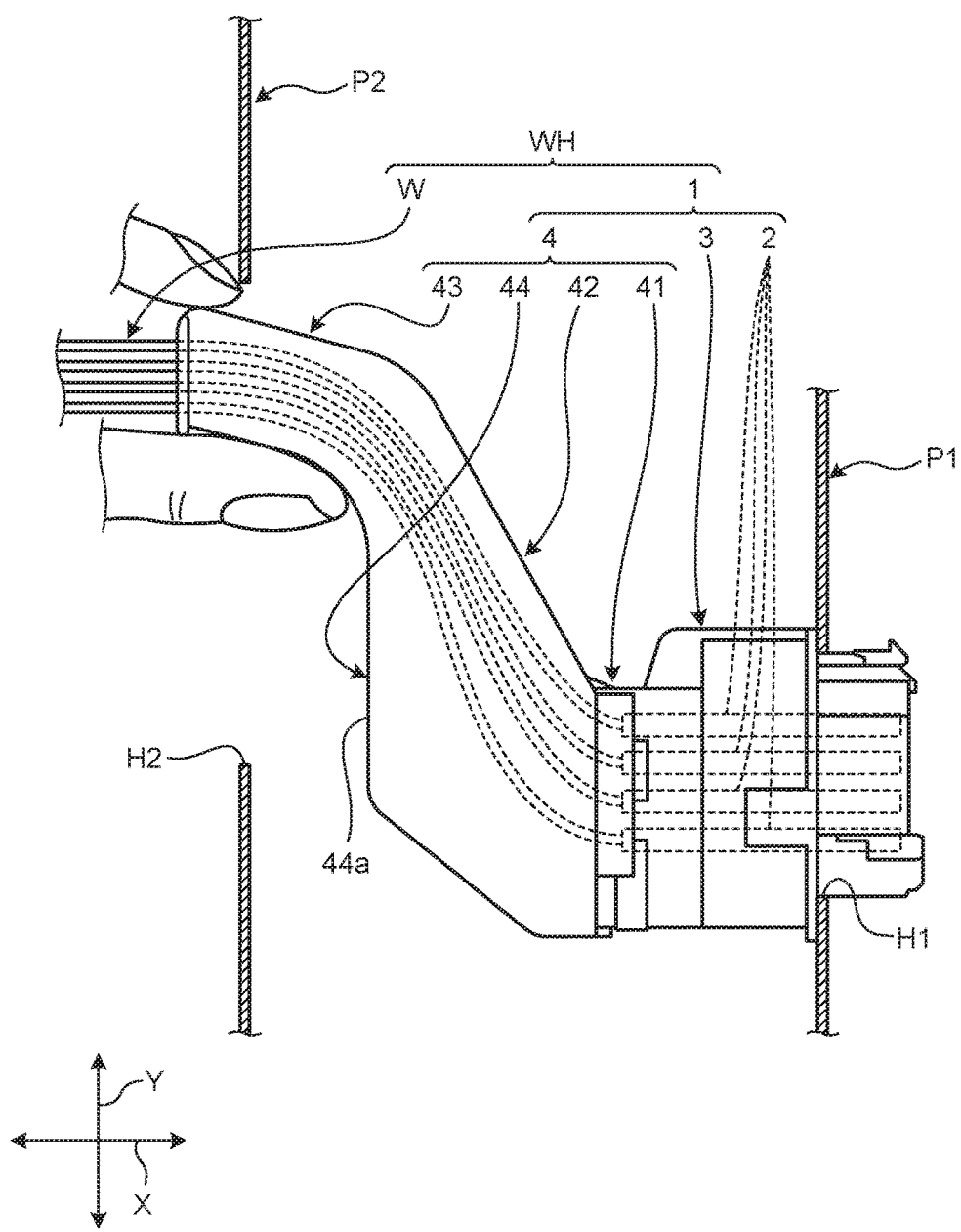
FIG. 1 is a schematic plan view illustrating a schematic structure of a connector according to an embodiment.
Figure 2:
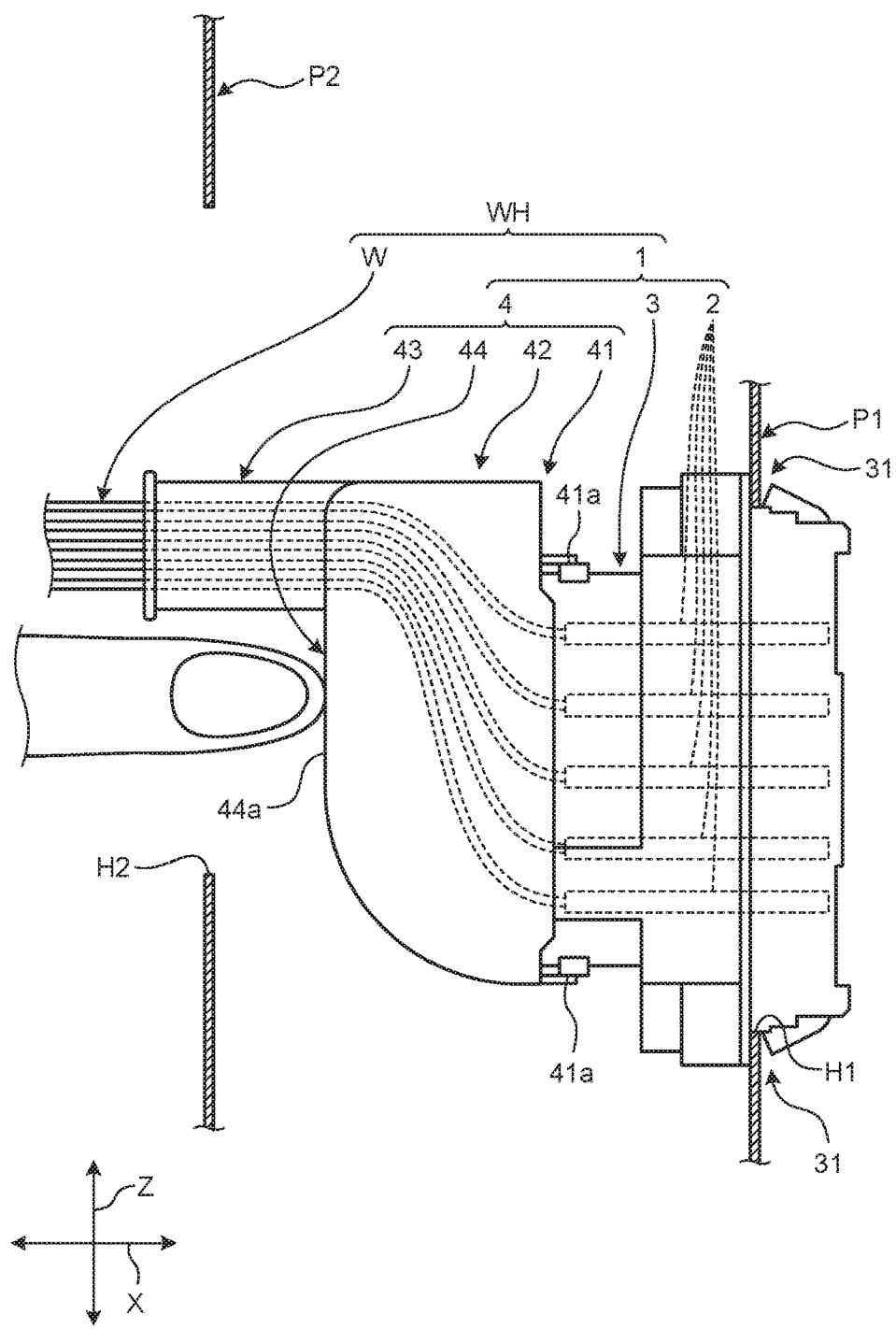
FIG. 2 is a schematic side view illustrating the schematic structure of the connector according to the embodiment.

A connector 1 according to the present embodiment that is illustrated in FIG. 1 and FIG. 2 is, for example, applied to a wire harness WH used for a vehicle. Here, the wire harness WH constitutes, for example, a collective component configured to bundle a plurality of wiring materials W used for power supply or signal communication configured to connect between respective devices mounted on the vehicle, and simultaneously connects the plurality of wiring materials W to the respective devices by using a connector 1. The wire harness WH includes the wiring materials W having conductive properties, and the connector 1 connected with the wiring materials W. The wire harness WH may further include a fixture, a protector, a grommet described below, or the like. The wiring materials W are, for example, constituted of a metallic rod such that a rod-like conductive member is covered with an insulative covering part from an outside thereof, an electric wire such that a conductor part (core wire) composed of a plurality of conductive metallic wires are covered with an insulative covering part from the outside thereof, and an electric wire bundle such that the electric wires are bundled.

Note that the connector in the present embodiment can apply to one wiring material, without being limited to the plurality of wiring materials.

The connector 1 according to the present embodiment is a panel fixing type connector configured to be fitted in and fixed to an attachment hole H1 formed in an attachment panel P1. The attachment panel P1 is, for example, a plate-like member interposed between a wiring space on a body side of a vehicle, and a wiring space on a door side of the vehicle. The connector 1 according to the present embodiment constitutes, for example, a waiting connector configured to fitted in and fixed to the attachment hole H1 from a wiring space side on the body side of the vehicle, and an attachment connector that is a mating connector is fitted in the connector 1 that constitutes the waiting connector from the wiring space side on the door side of the vehicle thus forming an electrical interconnection part. Due to such constitution, the connector 1 constitutes a wiring-material-to-wiring-material connection mechanism that connects the wiring materials W arranged on the body side, and mating wiring materials that are arranged on the door side and connected with the mating connector (attachment connector).

Figure 3:
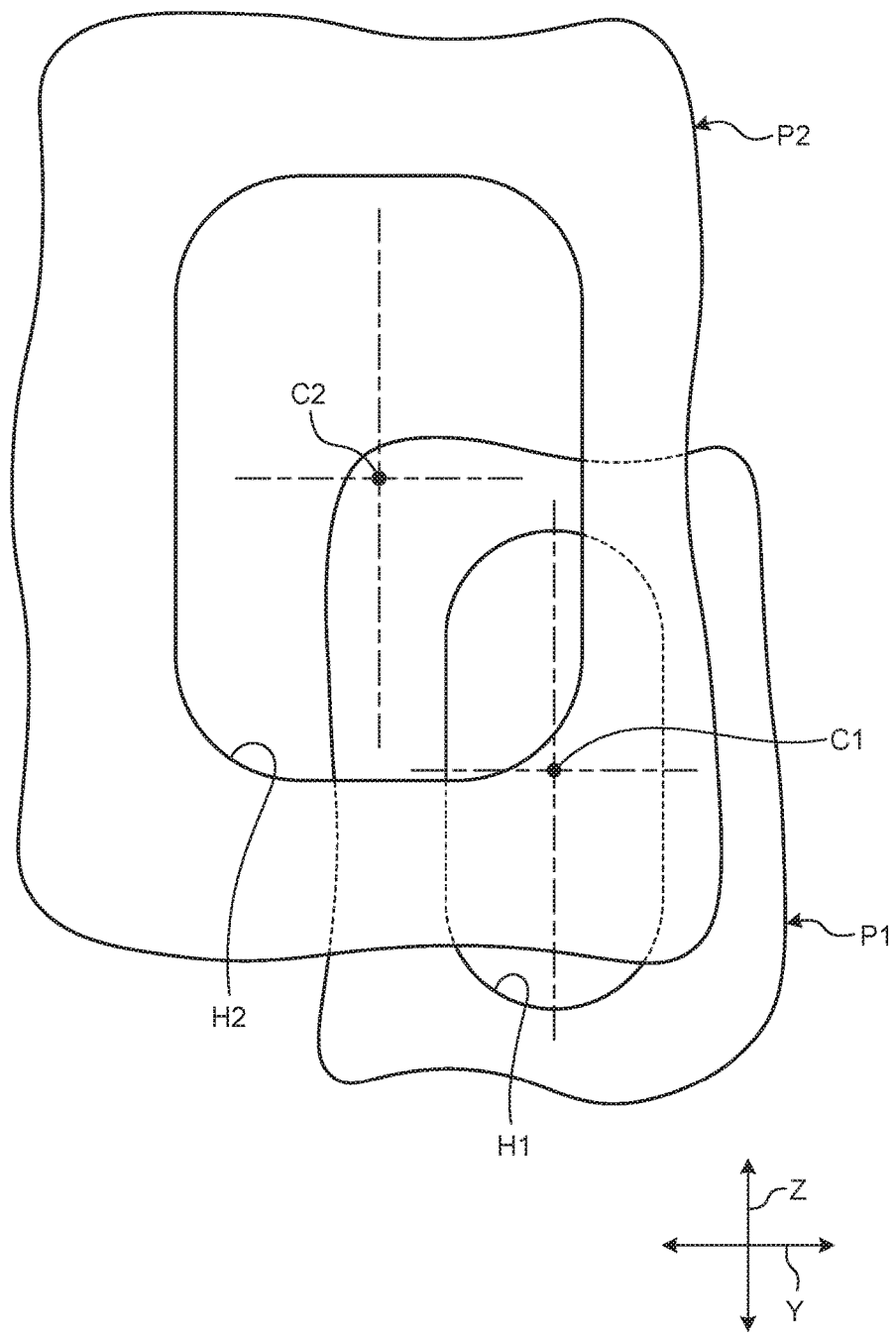
FIG. 3 is a schematic front view for explaining an attachment panel to which the connector according to the embodiment is applied.

Furthermore, the attachment panel P1 according to the present embodiment is arranged to face an opposite panel P2 in an opposed manner in the axial direction X, and the connector 1 according to the present embodiment is fitted in the attachment hole H1 of the attachment panel P1 in the axial direction X from the opposite panel P2 side of the attachment panel P1 by way of an insertion hole H2 formed in the opposite panel P2. That is, as for the attachment panel P1, the opposite panel P2 is located on an attachment face side of the attachment panel P1 to which the connector 1 is attached, and the attachment hole H1 in which the connector 1 is fitted is located on the inner part side of the insertion hole H2, which is formed in the opposite panel P2, in the axial direction X. The attachment hole H1 is formed in a penetrating manner through the attachment panel P1 in the axial direction X, and communicates two spaces defined on both sides of the attachment panel P1, which constitutes a boundary, in the axial direction X. The insertion hole H2 is formed in a penetrating manner through the opposite panel P2 in the axial direction X, and communicates two spaces defined on both sides of the opposite panel P2, which constitutes a boundary, in the axial direction X. Furthermore, the attachment hole H1 formed in the attachment panel P1 and the insertion hole H2 formed in the opposite panel P2 are, as illustrated in FIG. 3, located at respective positions deviated from each other in the intersecting direction (width direction Y, height direction Z) intersecting with the axial direction X that is the fitting direction of the connector 1 with respect to the attachment hole H1. The attachment hole H1 and the insertion hole H2 are located at respective positions deviated from each other in such a manner that at least a part of the attachment hole H1 is located outside the area of the insertion hole H2 as viewed in an axial direction; that is, as viewed in the axial direction X. That is, at least a part of the attachment hole H1 is not overlapped with the insertion hole H2 as viewed in the axial direction. In addition, the attachment hole H1 and the insertion hole H2 are located at respective positions deviated from each other in such a manner that a centroid position C1 of the attachment hole H1 is located outside the area of the insertion hole H2, and a centroid position C2 of the insertion hole H2 is located outside the area of the attachment hole H1. Here, each of the attachment hole H1 and the insertion hole H2 is formed in line symmetry with respect to the width direction Y and the height direction Z, and the centroid positions C1 and C2 correspond to the respective center positions of the attachment hole H1 and the insertion hole H2. The attachment hole H1 according to the present embodiment is formed in such a shape that a connector housing 3 of the connector 1, which is described below, is capable of being fitted in the attachment hole H1, and is here formed in an arcuate elongated shape whose longitudinal side extends in the height direction Z. The insertion hole H2 is typically formed as a hole larger than the attachment hole H1. The insertion hole H2 according to the present embodiment is formed in such a shape that the connector housing 3, which is described below, of the connector 1 is capable of passing through the insertion hole H2, and being inserted into the insertion hole H2. Here, the insertion hole H2 is formed in a rectangular shape whose longitudinal side extends in the height direction Z, and corner portion is rounded. Furthermore, in the attachment hole H1 and the insertion hole H2 according to the present embodiment, the centroid position C1 of the attachment hole H1 and the centroid position C2 of the insertion hole H2 are located at respective positions deviated from each other in the intersecting direction, that is in the width direction Y and the height direction Z, two directions orthogonal to each other. That is, the attachment hole H1 and the insertion hole H2 are located at respective positions obliquely deviated from each other in the width direction Y and the height direction Z. Furthermore, the connector 1 according to the present embodiment is applied to the case that as described above, the opposite panel P2 is arranged to face the attachment panel P1 in which the attachment hole H1 is formed, and the insertion hole H2 is formed in the opposite panel P2 at the position deviated from the attachment hole H1 thus ensuring properly the attaching workability of the connector 1 to the attachment panel P1. Hereinafter, with reference to FIG. 1 and FIG. 2, the constitution of the connector 1 is explained in detail.

More specifically, the connector 1 is, as illustrated in FIG. 1 and FIG. 2, provided with a plurality of terminals 2, the connector housing 3, and a cover 4 used as a connector cover.

The plurality of terminals 2 are electrically connected with respective terminals of the plurality of wiring materials W. Each of the plurality of terminals 2 is composed of a conductive metallic material. The terminal 2 is capable of being connected with a mating terminal arranged in a mating connector. The terminal 2 may be a male terminal to be electrically connected with a mating terminal formed in a female terminal shape, and may be a female terminal to be electrically connected with a mating terminal formed in a male terminal shape.

The connector housing 3 is capable of housing and holding the terminal 2 arranged in the axial direction X, and being fitted in a mating connector. The connector housing 3 is composed of an insulative resin material. The connector housing 3 causes the terminal 2 to be inserted into each of a plurality of terminal insertion chambers (not illustrated in the drawings) in the axial direction X, and holds the terminal 2 in each of the terminal insertion chambers. The terminal insertion chambers are formed in the axial direction X. The connector housing 3 is capable of being fitted in a mating connector housing that constitutes the mating connector. The connector 1 causes the connector housing 3 and the mating connector housing to be fitted in each other in the axial direction X so as to establish a connector joint thus connecting electrically the terminal 2 and the mating terminal that are respectively provided to the connector housing 3 and the mating connector housing, and forming a connection part electrically connecting the connector housing 3 and the mating connector housing with each other. Furthermore, the connector housing 3 according to the present embodiment is constituted so that the connector housing 3 is capable of being fitted in the attachment hole H1, which is formed in the attachment panel P1, in the axial direction X, and passing through the insertion hole H2 formed in the opposite panel P2. That is, the connector housing 3 is capable of being fitted in the attachment hole H1, and the outside shape of the connector housing 3 is formed in such a manner that the connector housing 3 is capable of passing through the insertion hole H2. The connector housing 3 has a plurality of engagement parts 31 arranged on the outside thereof. The engagement part 31 includes a locking claw part or the like, and is engaged with the attachment edge portion that forms the attachment hole H1 in the attachment panel P1 in a state that the connector housing 3 is fitted in the attachment hole H1 thus fixing the connector housing 3 to the attachment hole H1.

The cover 4 is attached to the connector housing 3, and causes the wiring materials W connected with the terminal 2 to be inserted into the cover 4 along the axial direction X, and offset in the intersecting direction intersecting with the axial direction X; that is, in the width direction Y and the height direction Z. The cover 4 may, for example, have a function as a rear holder that suppresses the dropping out of the terminal 2 held in the connector housing 3. The cover 4 includes an attachment portion 41, an offset portion 42, a grip portion 43, and a depression portion 44, all of which are integrally formed of an insulative resin material. The attachment portion 41, the offset portion 42, and the grip portion 43 are integrally formed with each other in an approximately cylindrical shape to constitute the cover 4, the inside of the cover 4 is formed as a series of communication spaces, and the wiring materials W are inserted into the communication spaces in the axial direction X. The attachment portion 41, the offset portion 42, and the grip portion 43 are arranged in this order from a connector housing 3 side of the cover 4 in the axial direction X, and integrally formed with each other to constitute the cover 4. Furthermore, in the cover 4, the depression portion 44 is formed on the outside surface of the offset portion 42.

The attachment portion 41 is a portion that is attached to the connector housing 3, and constitutes a proximal end portion in the cover 4. The attachment portion 41 is provided to one end of the connector housing 3 where the plurality of wiring materials W connected with the respective terminals 2 extend; that is, the one end of the connector housing 3 that is opposite to the other end of the connector housing 3 where the connector 1 is fitted in a mating connector. The attachment portion 41 has a plurality of engagement parts 41a arranged on the one end of the connector housing 3. The engagement part 41a includes a locking claw part or the like, and is engaged with the connector housing 3 in a state that the plurality of wiring materials W connected with the respective terminals 2 provided to the connector housing 3 are inserted into the inside of the cover 4 thus attaching and fixing the cover 4 to the connector housing 3.

The offset portion 42 is a portion that causes the wiring materials W inserted into the communication spaces in the inside of the cover 4 to be offset along the width direction Y and the height direction Z. That is, the offset portion 42 inserts thereinto the wiring materials W connected with the respective terminals 2 along the axial direction X, and offsets the wiring materials W along the intersecting direction intersecting with the axial direction X; that is, along the width direction Y and the height direction Z. The offset portion 42 is formed as a portion crooked along the width direction Y and the height direction Z from the end of the attachment portion 41 that is opposite to the connector housing 3 side of the attachment portion 41. Due to such constitution, the offset portion 42 crooks the wiring path of the wiring materials W along the width direction Y and the height direction Z, and holds the wiring path of the wiring materials W in this state. The cover 4 interposes the offset portion 42 in the wiring path of the wiring materials W, and crooks the wiring path of the wiring materials W along the width direction Y and the height direction Z thus offsetting the wiring materials W along the width direction Y and the height direction Z. That is, in the cover 4, the offset portion 42 offsets, as viewed in an axial direction, the end of the cover 4 that is opposite to the connector housing 3 side of the cover 4, that is, the position of the wiring materials W in the end of the grip portion 43 side of the cover 4, in the width direction Y and the height direction Z with respect to the position of the wiring materials W in the end of the connector housing 3. The offset portion 42 is formed in an extending manner in the width direction Y and the height direction Z depending on a positional deviation of the insertion hole H2 with respect to the attachment hole H1 in the width direction Y and the height direction Z, and offsets the wiring materials W inserted into the inside of the cover 4 up to a position where the wiring materials W are capable of being inserted into the insertion hole H2.

The grip portion 43 is a portion formed in such a shape that the grip portion 43 is capable of being gripped by a worker or the like, and is formed in a cylindrical shape in an projecting manner along the axial direction X from one end of the offset portion 42 that is opposite to the attachment portion 41 side of the offset portion 42. Furthermore, the grip portion 43 according to the present embodiment is formed at a position where the grip portion 43 is exposed in the insertion hole H2 as viewed in an axial direction in a state that the connector housing 3 is fitted in the attachment hole H1. Here, the grip portion 43 is formed in such a manner that one end of the grip portion 43 that is opposite to the offset portion 42 is arranged, as viewed in an axial direction, in a projecting manner from the insertion hole H2 to the front face side of the opposite panel P2, that is, to a side of the opposite panel P2 that is opposite to the attachment panel P1 side of the opposite panel P2, in a state that the grip portion 43 is arranged in an exposed manner in the insertion hole H2. The offset portion 42 mentioned above is formed in an extending manner in the width direction Y and the height direction Z depending on a positional deviation of the insertion hole H2 with respect to the attachment hole H1 in the width direction Y and the height direction Z and hence, the grip portion 43 is formed at a position where the grip portion 43 is exposed in the insertion hole H2. Due to such constitution, the grip portion 43 enables the wiring materials W inserted into the communication space in the inside of the cover 4 to be inserted into the insertion hole H2.

The depression portion 44 is a portion that is arranged adjacent to the grip portion 43, and formed in such a manner that the connector housing 3 is capable of being depressed into the attachment hole H1 along the axial direction X in a state that the connector housing 3 is attached to the cover 4. Here, the depression portion 44 is, as mentioned above, formed on the outside surface of the offset portion 42. More specifically, the depression portion 44 is, as viewed in an axial direction, formed in an area where the depression portion 44 is arranged in an exposed manner in the insertion hole H2 in the outside surface of the offset portion 42. The depression portion 44 includes a flat face 44a formed along the intersecting direction; that is, along the width direction Y and the height direction Z that are orthogonal to the axial direction X. The flat face 44a is formed in the area where the flat face 44a is arranged in an exposed manner in the insertion hole H2 on the outside surface of the offset portion 42 that is opposite to the attachment portion 41 side of the offset portion 42.

The cover 4 constituted as described above is attached to the connector housing 3 by the following procedures, that is, in a state that the plurality of wiring materials W are inserted into the communication spaces in the inside of the cover 4, the terminals 2 provided to the respective ends of the wiring materials W are inserted into the respective terminal insertion chambers of the connector housing 3 and thereafter, the attachment portion 41 is attached to the connector housing 3.

In the connector 1, the cover 4, and the wire harness WH that are explained heretofore, when the opposite panel P2 is arranged to face the attachment panel P1 in which the attachment hole H1 is formed, in an opposed manner, and the insertion hole H2 is formed in the opposite panel P2 at a position deviated from the attachment hole H1 in the intersecting direction (width direction Y, height direction Z), the wiring materials W that are connected with the terminal 2 and inserted into the cover 4 is offset along the intersecting direction (width direction Y, height direction Z) by the offset portion 42 of the cover 4 thus arranging the wiring materials W while inserting the wiring materials W inserted into the inside of the cover 4, into the insertion hole H2. Furthermore, in the connector 1, the cover 4, and the wire harness WH, the grip portion 43 of the cover 4 is formed in such a shape that the grip portion 43 is capable of being gripped at a position where the grip portion 43 is exposed in the insertion hole H2 in a state that the connector housing 3 is fitted in the attachment hole H1 and hence, it is possible to fit the connector housing 3 in the attachment hole H1 by way of the insertion hole H2 while the grip portion 43 is gripped. As a result, it is possible to improve the attaching workability of the connector 1, the cover 4, and the wire harness WH to the attachment panel P1, and reduce, for example, attaching working hours.

More specifically, in the connector 1, the cover 4, and the wire harness WH that are explained heretofore, to consider the positional relation between the attachment hole H1 and the insertion hole H2, in the cases where at least a part of the attachment hole H1 is located outside the area of the insertion hole H2 as viewed in an axial direction; the centroid position C1 of the attachment hole H1 is located outside the area of the insertion hole; the centroid position C1 of the attachment hole H1 and the centroid position C2 of the insertion hole H2 are located at respective positions deviated from each other in the intersecting direction and in two directions (width direction Y and height direction Z) orthogonal to each other; and the like, the connector housing 3 is capable of being fitted in the attachment hole H1 by way of the insertion hole H2 while the grip portion 43 is gripped thus improving the attaching workability of the connector 1, the cover 4, and the wire harness WH to the attachment panel P1. In particular, in the connector 1, the cover 4, and the wire harness WH, in the case where the centroid position C1 of the attachment hole H1 and the centroid position C2 of the insertion hole H2 are located at respective positions deviated from each other in the intersecting direction (two directions (width direction Y and height direction Z) orthogonal to each other), that is, in the case where the attachment hole H1 and the insertion hole H2 are obliquely deviated from each other in two dimensions, the grip portion 43 is gripped thus exhibiting more notably advantageous effects of the attaching workability improvement of the connector 1, the cover 4, and the wire harness WH.

Furthermore, in the connector 1, the cover 4, and the wire harness WH that are explained heretofore, the depression portion 44 that is arranged adjacent to the grip portion 43 in the cover 4 and arranged in an exposed manner in the insertion hole H2 is depressed while the grip portion 43 is gripped and hence, it is possible to achieve a constitution in which the connector housing 3 is easily depressed into and fitted in the attachment hole H1 along the axial direction X, thus further improving the attaching workability of the connector 1, the cover 4, and the wire harness WH to the attachment panel P1.

Furthermore, in the connector 1, the cover 4, and the wire harness WH that are explained heretofore, since the depression portion 44 includes the flat face 44a formed along the intersecting direction (width direction Y, height direction Z) that intersects with the axial direction X, a depressing force that depresses the connector housing 3 into the attachment hole H1 along the axial direction X is applied to the flat face 44a, thus easily applying the depressing force to the connector housing 3. As a result, it is possible to further improve the attaching workability of the connector 1, the cover 4, and the wire harness WH to the attachment panel P1.

Figure 4:
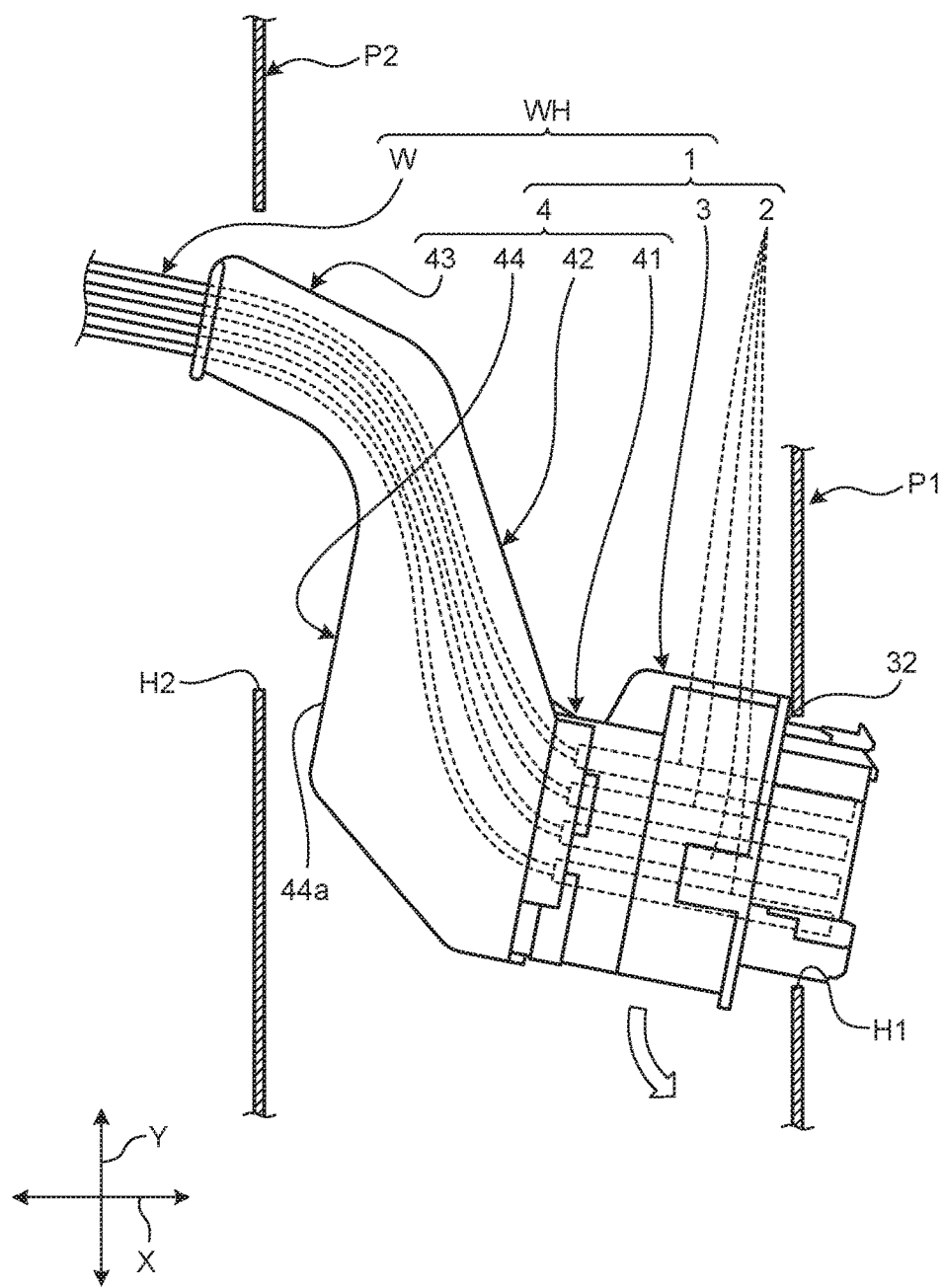
FIG. 4 is a schematic plan view for explaining a rotational fulcrum of the connector according to the embodiment.

In addition, in the connector 1, the cover 4, and the wire harness WH that are explained heretofore, as illustrated in FIG. 4, for example, it is also possible to fit the connector housing 3 in the attachment hole H1 in the axial direction X while the grip portion 43 is held, and the connector housing 3 is rotated, depending on the positional relation between the attachment hole H1 and the insertion hole H2. In this case, the connector housing 3 has a corner portion 32 that constitutes a fulcrum of rotational operation that rotates the connector housing 3 to a fitting position in the attachment hole H1. The corner portion 32 is located at a place which abuts with an attaching edge portion that forms the attachment hole H1 in the attachment panel P1. In the connector 1, the cover 4, and the wire harness WH, the corner portion 32 is pressed against the attaching edge portion that forms the attachment hole H1 to constitute the fulcrum of rotational operation thus rotating the connector housing 3 to the fitting position in the attachment hole H1 about a rotational-axis line passing through the fulcrum as a rotation center. As a result, it is possible to further improve the attaching workability of the connector 1, the cover 4, and the wire harness WH to the attachment panel P1.

Here, the connector, the connector cover, and the wire harness according to the above-mentioned embodiment are not limited to the configurations described in the embodiment mentioned above, and various modifications and changes can be made without departing from the gist of the descriptions in the claims.

Although the connector 1 according to the present embodiment is explained as a connector that constitutes a waiting connector, any connector can be adopted provided that the connector is a panel fixing type connector.

In the explanation above, the attachment hole H1 and the insertion hole H2 are explained assuming that the attachment hole H1 and the insertion hole H2 are, as viewed in an axial direction, located at respective positions deviated from each other in such a manner that the centroid position C1 of the attachment hole H1 is located outside the area of the insertion hole H2, and the centroid position C2 of the insertion hole H2 is located outside the area of the attachment hole H1. However, the present embodiment is not limited to this case. Furthermore, in the explanation above, the attachment hole H1 and the insertion hole H2 are explained assuming that the centroid position C1 of the attachment hole H1 and the centroid position C2 of the insertion hole H2 are located at respective positions deviated from each other in the width direction Y and the height direction Z. However, the present embodiment is not limited to this case, and the attachment hole H1 and the insertion hole H2 may be located at respective positions deviated from each other in either one of the width direction Y and the height direction Z. Furthermore, although the explanation is made assuming that each of the attachment hole H1 and the insertion hole H2 is formed in a line-symmetric shape with respect to the width direction Y and the height direction Z, the present embodiment is not limited to this case, and each of the attachment hole H1 and the insertion hole H2 may be formed in an asymmetrical shape provided that the attachment hole H1 and the insertion hole H2 are located at respective positions deviated from each other with respect to the intersecting direction. In addition, the attachment hole H1 and the insertion hole H2 may be arranged in such a manner that the attachment hole H1 and the insertion hole H2 are not overlapped with each other as viewed in an axial direction, that is, the attachment hole H1 and the insertion hole H2 may be arranged in a completely spaced apart manner from each other. Even in this case, in the connector 1, while a grip portion 43A arranged in an exposed manner in the insertion hole H2 is gripped in the cover 4, the connector housing 3 is capable of being fitted in the attachment hole H1 by way of the insertion hole H2 thus improving more remarkably the attaching workability of the connector 1 to the attachment panel P1.

Although the explanation is made heretofore assuming that the cover 4 is formed in such a manner that the attachment portion 41, the offset portion 42, and the grip portion 43 are integrally formed in an approximately cylindrical shape whose inner space is formed as a series of communication spaces, and the wiring materials W are inserted into the communication spaces along the axial direction X, the present embodiment is not limited to this case. The cover 4 may be formed in such a manner that a portion corresponding to the attachment portion 41, the offset portion 42, and the grip portion 43 is formed in an approximately cylindrical shape by combining two divided bodies each of which is formed in a semi-cylindrical shape. Furthermore, the shape of the cover 4 is not limited to an approximately cylindrical shape provided that the cover 4 is constituted in such a manner that the inner portion of each of the attachment portion 41, the offset portion 42, and the grip portion 43 is formed as a series of communication spaces, and the wiring materials W are inserted into the communication spaces. The cover 4 may be formed in such a manner that the cross-sectional shape of the cover 4 is an approximately U-shape, more specifically a lied U-shape, an approximately C-shape, or the like as viewed in a direction that intersects with the wiring direction.

Figure 5:
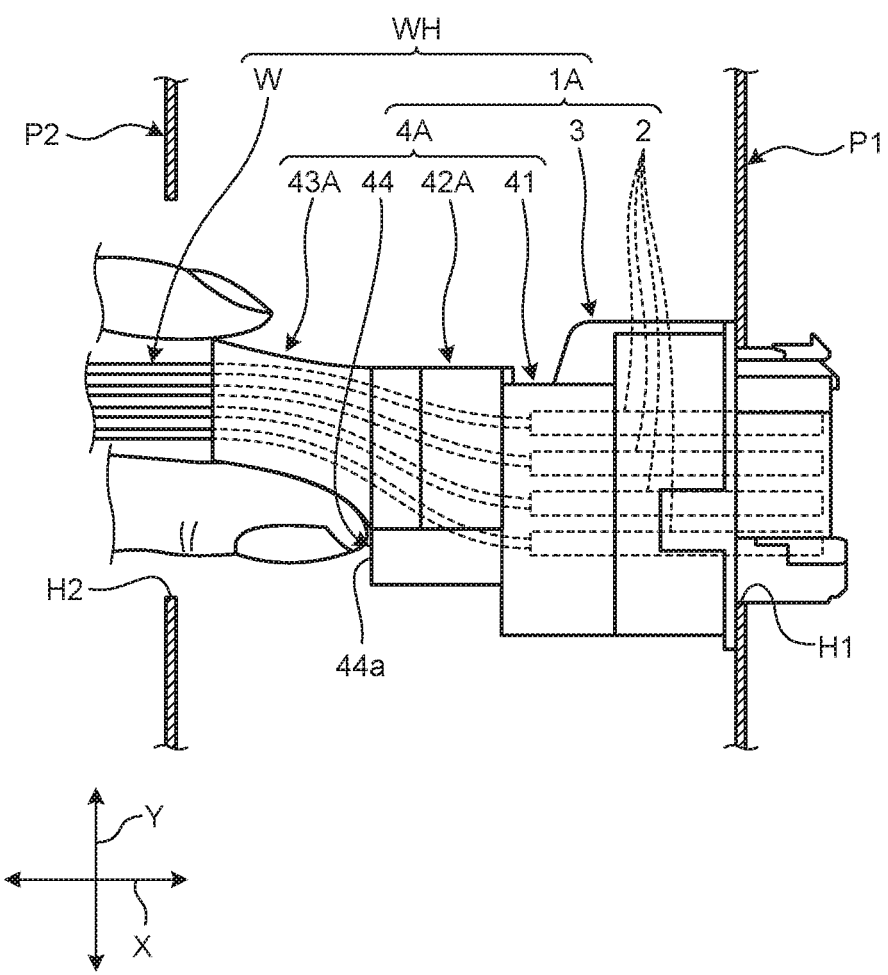
FIG. 5 is a schematic plan view illustrating a schematic structure of a connector according to a modification.

Although the explanation is made heretofore assuming that as viewed in an axial direction, the grip portion 43 is formed in such a manner that one end of the grip portion 43 that is opposite to the offset portion 42 is projected from the insertion hole H2 to a side of the opposite panel P2 that is opposite to the attachment panel P1 side of the opposite panel P2 in a state that the grip portion 43 is exposed in the insertion hole H2, the present embodiment is not limited to this case. For example, a connector 1A according to a modification illustrated in FIG. 5 differs from the connector 1 in that the connector 1A is provided with a cover 4A as a connector cover in place of the cover 4, and the cover 4A has an offset portion 42A and a grip portion 43A in place of the offset portion 42 and the grip portion 43. The grip portion 43A according to the present modification is, as viewed in an axial direction, formed in such a manner that in a state that the grip portion 43A is exposed in the insertion hole H2, an end of the grip portion 43A that is opposite to the offset portion 42A is located on the inner side of the insertion hole H2, that is, at an inner position on the attachment panel P1 side of the insertion hole H2, and the offset portion 42A is also formed in a shape corresponding to the shape of the grip portion 43A. Even in this case, in the connector 1A, while the grip portion 43A exposed in the insertion hole H2 is gripped in the cover 4A, the connector housing 3 is capable of being fitted in the attachment hole H1 by way of the insertion hole H2 thus improving the attaching workability of the connector 1A to the attachment panel P1.

In the connector, the connector cover, and the wire harness according to the present embodiment, when the opposite panel is arranged to face the attachment panel in which the attachment hole is formed, in an opposed manner, and the insertion hole is formed in the opposite panel at a position deviated from the attachment hole in the intersecting direction, the wiring materials that is connected with the terminal and inserted into the cover is offset along the intersecting direction by the cover, and the grip portion is formed in such a shape that the grip portion is capable of being gripped at the position where the grip portion of the cover is exposed in the insertion hole in a state that the connector housing is fitted in the attachment hole. Due to such constitution, in the connector, the connector cover, and the wire harness, while the grip portion located at a position where the grip portion is exposed in the insertion hole is gripped, the connector housing is capable of being fitted in the attachment hole by way of the insertion hole thus achieving the advantageous effect of improving the attaching workability of the connector to the attachment panel.

Although the invention has been described with respect to the specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connector comprising:
   a connector housing provided with a terminal and capable of being fitted in an attachment hole formed in an attachment panel in an axial direction; and
   a cover attached to the connector housing and having a first axial end and a second axial end opposite the first axial end, the cover causing a wiring material connected with the terminal to enter into the first axial end of the cover in the axial direction and causing the wiring material to be offset in a width direction and a height direction that are orthogonal to the axial direction and exit the cover at the second axial end of the cover such that the wiring material enters the cover and exits the cover in substantially the same axial direction, wherein
   the cover includes a grip portion formed in such a shape that the grip portion is capable of being gripped at a position where the grip portion is exposed in an insertion hole which is formed in an opposite panel arranged to face the attachment panel in the axial direction, through which the connector housing is capable of passing, and which is located at a position deviated from the attachment hole in the width and height directions, in a state where the connector housing is fitted in the attachment hole.

2. The connector according to claim 1, wherein
   the cover includes a depression portion arranged adjacent to the grip portion, the depression portion being formed so that the connector housing is capable of being depressed into the attachment hole in the axial direction, the depression portion being arranged in an exposed manner in the insertion hole as viewed in the axial direction.

3. The connector according to claim 2, wherein
   the depression portion includes a flat face formed in the width and height directions.

4. The connector according to claim 1, wherein
   the connector housing includes a corner portion configured to constitute a fulcrum of rotational operation that rotates the connector housing to a fitting position within the attachment hole, the corner portion being located at a position abutting with an attachment edge portion that defines the attachment hole.

5. The connector according to claim 2, wherein
   the connector housing includes a corner portion configured to constitute a fulcrum of rotational operation that rotates the connector housing to a fitting position within the attachment hole, the corner portion being located at a position abutting with an attachment edge portion that defines the attachment hole.

6. The connector according to claim 3, wherein
   the connector housing includes a corner portion configured to constitute a fulcrum of rotational operation that rotates the connector housing to a fitting position within the attachment hole, the corner portion being located at a position abutting with an attachment edge portion that defines the attachment hole.

7. The connector according to claim 1, wherein:
   the connector is fitted to the attachment hole through the insertion hole, and the attachment hole and the insertion hole are arranged so that at least a part of the attachment hole is located outside an area of the insertion hole as viewed in the axial direction.

8. The connector according to claim 2, wherein:
the connector is fitted to the attachment hole through the insertion hole, and
the attachment hole and the insertion hole are arranged so that at least a part of the attachment hole is located outside an area of the insertion hole as viewed in the axial direction.

9. The connector according to claim 3, wherein:
the connector is fitted to the attachment hole through the insertion hole, and
the attachment hole and the insertion hole are arranged so that at least a part of the attachment hole is located outside an area of the insertion hole as viewed in the axial direction.

10. The connector according to claim 1, wherein:
the connector is fitted to the attachment hole through the insertion hole, and
the attachment hole and the insertion hole are arranged so that a centroid position of the attachment hole is located outside an area of that of the insertion hole as viewed in the axial direction.

11. The connector according to claim 2, wherein:
the connector is fitted to the attachment hole through the insertion hole, and
the attachment hole and the insertion hole are arranged so that a centroid position of the attachment hole is located outside an area of that of the insertion hole as viewed in the axial direction.

12. The connector according to claim 3, wherein:
the connector is fitted to the attachment hole through the insertion hole, and
the attachment hole and the insertion hole are arranged so that a centroid position of the attachment hole is located outside an area of that of the insertion hole as viewed in the axial direction.

13. The connector according to claim 1, wherein:
the connector is fitted to the attachment hole through the insertion hole, and
the attachment hole and the insertion hole are arranged so that a centroid position of the attachment hole and a centroid position of the insertion hole are located at respective positions deviated from each other in the width and height directions.

14. The connector according to claim 2, wherein:
the connector is fitted to the attachment hole through the insertion hole, and
the attachment hole and the insertion hole are arranged so that a centroid position of the attachment hole and a centroid position of the insertion hole are located at respective positions deviated from each other in the width and height directions.

15. The connector according to claim 3, wherein:
the connector is fitted to the attachment hole through the insertion hole, and
the attachment hole and the insertion hole are arranged so that a centroid position of the attachment hole and a centroid position of the insertion hole are located at respective positions deviated from each other in the width direction and the height direction that are orthogonal to each other.

16. The connector according to claim 1, wherein:
the connector is fitted to the attachment hole through the insertion hole, and
the attachment hole and the insertion hole are located at respective positions so as not to overlap with each other as viewed in the axial direction.

17. The connector according to claim 2, wherein:
the connector is fitted to the attachment hole through the insertion hole, and
the attachment hole and the insertion hole are located at respective positions so as not to overlap with each other as viewed in the axial direction.

18. The connector according to claim 3, wherein:
the connector is fitted to the attachment hole through the insertion hole, and
the attachment hole and the insertion hole are located at respective positions so as not to overlap with each other as viewed in the axial direction.

19. A connector cover comprising:
a first axial end and a second axial end opposite the first axial end;
an attachment portion attached to a connector housing fitted in an attachment hole in an axial direction, the connector housing being provided with a terminal, and the attachment hole being formed in an attachment panel;
an offset portion configured to cause a wiring material connected to the terminal to enter into the first axial end of the cover in the axial direction, the offset portion causing the wiring material to be offset in a width direction and a height direction that are orthogonal to the axial direction and exit the cover at the second axial end of the cover such that the wiring material enters the cover and exits the cover in substantially the same direction; and
a grip portion formed in such a shape that the grip portion is capable of being gripped at a position where the grip portion is exposed in an insertion hole formed in an opposite panel arranged to face the attachment panel in an opposed manner in the axial direction so as to cause the connector housing to pass through the insertion hole, the insertion hole being located at a position deviated from the attachment hole in the width and height directions, as viewed in the axial direction, in a state where the connector housing is fitted in the attachment hole.

20. A wire harness comprising:
a conductive wiring material; and
a connector connected with the conductive wiring material, wherein
the connector includes:
  a connector housing provided with a terminal connected with the conductive wiring material, and capable of being fitted in an attachment hole formed in an attachment panel in an axial direction; and
  a cover attached to the connector housing and having a first axial end and a second axial end opposite the first axial end, the cover causing the conductive wiring material to enter into the first axial end of the cover in the axial direction and causing the conductive wiring material to be offset in a width direction and a height direction that are orthogonal to the axial direction and exit the cover at the second axial end of the cover such that the conductive wiring material enters the cover and exits the cover in substantially the same axial direction, and
the cover includes a grip portion formed in such a shape that the grip portion is capable of being gripped at a position where the grip portion is exposed in an insertion hole which is formed in an opposite panel arranged to face the attachment panel in the axial direction, through which the connector housing is capable of passing, and which is located at a position deviated from the attachment hole in the width and height directions, as viewed in the axial direction, in a state where the connector housing is fitted in the attachment hole.

\* \* \* \* \*